(12) United States Patent
Silvester et al.

(10) Patent No.: US 10,789,040 B1
(45) Date of Patent: Sep. 29, 2020

(54) INTERACTION BETWEEN TWO VIRTUAL ASSISTANTS

(71) Applicant: International Business Machines Corporation, Armonk, NY (US)

(72) Inventors: James M. J. Silvester, Basingstoke (GB); Livia E. Stacey, Basingstoke (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/432,216

(22) Filed: Jun. 5, 2019

(51) Int. Cl.
*G06F 17/00* (2019.01)
*G06F 3/16* (2006.01)
*H04L 12/58* (2006.01)

(52) U.S. Cl.
CPC .............. *G06F 3/165* (2013.01); *H04L 51/02* (2013.01)

(58) Field of Classification Search
CPC ................................. G06F 3/165; H04L 51/02
See application file for complete search history.

(56) References Cited

U.S. PATENT DOCUMENTS

| | | | |
|---|---|---|---|
| 9,047,856 B2 | 6/2015 | Smith | |
| 10,133,612 B2 | 11/2018 | Wood | |
| 2013/0166296 A1* | 6/2013 | Scheffer | G10L 17/02 704/243 |
| 2014/0047001 A1 | 2/2014 | Phillips | |
| 2014/0244712 A1 | 8/2014 | Walters | |
| 2014/0310002 A1* | 10/2014 | Nitz | G10L 15/1822 704/270.1 |
| 2015/0186156 A1 | 7/2015 | Brown | |
| 2017/0163804 A1 | 6/2017 | Bouzid | |
| 2018/0025726 A1 | 1/2018 | Gatti De Bayser | |
| 2019/0287513 A1* | 9/2019 | Alameh | G10L 13/0335 |

OTHER PUBLICATIONS

"How Chirp works", Technology |Send data with sound, Chirp, 145 City Rd, Hoxton, London, © 2019 Asio Ltd. Chirp™, 3 pages, <https://chirp.io/technology/>.
Lafrance, Adrienne, "An Artificial Intelligence Developed Its Own Non-Human Language", Jun. 15, 2017, The Atlantic.com, 4 pages, <https://www.theatlantic.com/technology/archive/2017/06/artificial-intelligence-develops-its-own-human-language/530436/>.
Solon, Olivia, "Google's robot assistant now makes eerily lifelike phone calls for you", the Guardian, May 8, 2018, 2 pages, <https://www.theguardian.com/technology/2018/may/08/google-duplex-assistant-phone-calls-robot-human>.
Turton, William, "Thousands of People are Watching Two Google Homes Argue with Each Other on Twitch", Jan. 6, 2017, Gizmodo, 4 pages, <https://gizmodo.com/thousands-of-people-are-watching-two-google-homes-argue-1790843285>.

\* cited by examiner

*Primary Examiner* — Joseph Saunders, Jr.
(74) *Attorney, Agent, or Firm* — Alexander G. Jochym

(57) ABSTRACT

A communication is received. The communication is analyzed to determine a form of the communication and a recipient of the communication. An encoded audio signal is transmitted to the recipient. Responsive to transmitting the encoded audio signal, a response encoded audio signal is received. Responsive to receiving the response encoded audio signal, the communication is transmitted to the recipient based on the response encoded audio signal.

14 Claims, 3 Drawing Sheets

INTERACTION BETWEEN TWO VIRTUAL ASSISTANTS

BACKGROUND

The present invention relates generally to the field of virtual assistants, and more particularly to an embedded audio signal to identify when an interaction is between two virtual assistants.

A virtual assistant is a piece of software that can perform tasks or services for a person based on verbal and/or data commands. Sometimes a virtual assistant can be also called an "intelligent personal assistant" or "chatbot". Virtual assistants are able to interpret human speech, analyze data, and respond in an indication, response or synthesized voice. Virtual assistants can perform tasks such as answer questions, control home automation devices, media devices, and manage other tasks such as email, to-do lists, calendars, etc.

SUMMARY

Embodiments of the present invention include a computer-implemented method, computer program product, and system for virtual assistant communication. In one embodiment, a communication is received. The communication is analyzed to determine a form of the communication and a recipient of the communication. An encoded audio signal is transmitted to the recipient. Responsive to transmitting the encoded audio signal, a response encoded audio signal is received. Responsive to receiving the response encoded audio signal, the communication is transmitted to the recipient based on the response encoded audio signal.

DETAILED DESCRIPTION

Virtual assistants are a piece of software that can perform tasks or services for a person based on verbal and/or data commands. When a virtual assistant performs these tasks time and resources are saved. There has been a rapid increase in consumer personal assistants that can interact using natural language processing via the voice. Many of these systems are gaining in functionality to interact with the external world in a semi-autonomous manner. The case of interaction between virtual assistants using natural language processing via the voice is becoming more frequent. However, there is no need for explicit voice natural language interaction for the case when the system can interact with each other and no human is present and/or no human interaction is needed. In these situations, the use of voice interaction increases the time and resources used by the system. This leads to an increase in bandwidth of communication lines. Embodiments of the present invention recognize time and computer resources can be saved/conserved using a data only transfer instead of a communication method involving audio interaction between one or more virtual assistants.

Embodiments of the present invention provide for a virtual assistant, such as virtual assistant program 112 or virtual assistant program 122. Embodiments of the present invention provide for receiving a communication. Embodiments of the present invention provide for analyzing the received communication. Embodiments of the present invention provide for transmitting an encoded audio signal. Embodiments of the present invention provide for determining whether an encoded audio signal was received. Embodiments of the present invention provide for, in response to an encoded audio signal not being received, transmitting the audio communication received. Embodiments of the present invention provide for, in response to a response an encoded audio signal being received, determining a protocol for communication. Embodiments of the present invention provide for transferring the data communication in the determined protocol.

Figure 1:
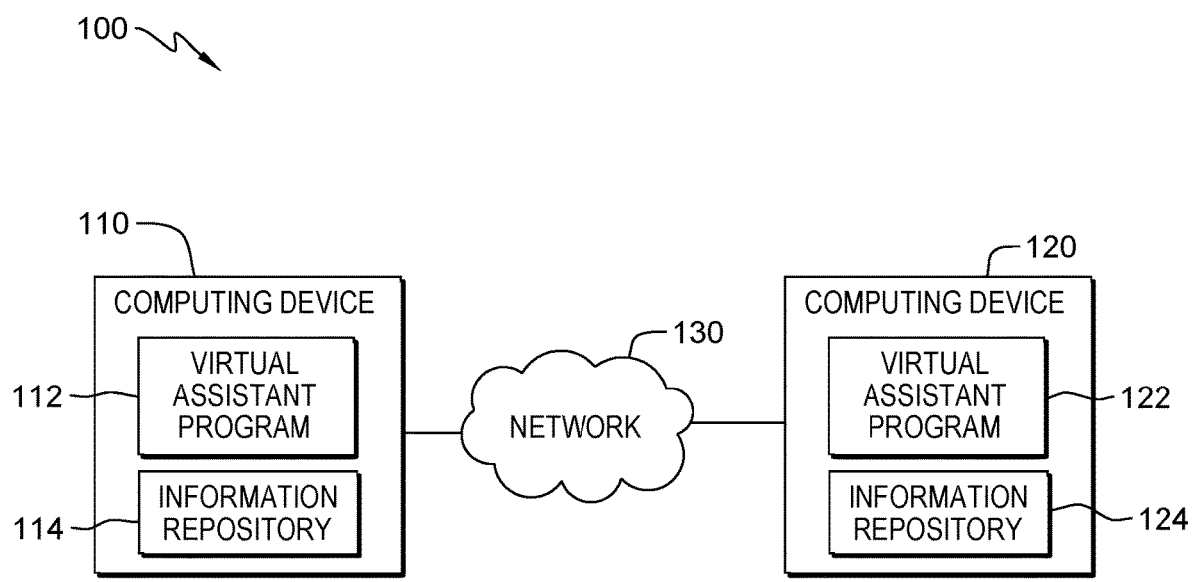
FIG. 1 is a functional block diagram of a network computing environment, generally designated 100, suitable for operation of virtual assistant program 112 or virtual assistant program 122, in accordance with at least one embodiment of the invention.

Referring now to various embodiments of the invention in more detail, FIG. 1 is a functional block diagram of a network computing environment, generally designated 100, suitable for operation of virtual assistant program 112 or virtual assistant program 122 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110 and computing device 120 interconnected over network 130. In embodiments of the present invention, network 130 can be a telecommunications network, a local area network (LAN), a wide area network (WAN), such as the Internet, or a combination of the three, and can include wired, wireless, or fiber optic connections. Network 130 may include one or more wired and/or wireless networks that are capable of receiving and transmitting data, voice, and/or video signals, including multimedia signals that include voice, data, and video formation. In general, network 130 may be any combination of connections and protocols that will support communications between computing device 110, computing device 120, and other computing devices (not shown) within network computing environment 100.

Computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with computing device 120, and other computing devices (not shown) within computing environment 100 via a network, such as network 130.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g. database server computers, application server computers, web servers, and media servers) that act as a single pool of seamless resources when accessed within network computing environment 100.

Computing device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In various embodiments of the invention, computing device 110 includes virtual assistant program 112 and information repository 114.

In an embodiment, virtual assistant program 112 is a piece of software that can perform tasks or services for a person based on verbal and/or data commands. In some embodiment, virtual assistant program 112 may interpret human speech, analyze data, and respond in an indication, response or synthesized voice. In some embodiments, virtual assistant 112 can perform tasks such as answer questions, control home automation devices (not shown), control media devices (not shown), and manage other tasks such as email, to-do lists, calendars, etc., in coordination with other programs (not shown).

Embodiments of the present invention provide for a virtual assistant program 112 that receives a communication. In embodiments of the present invention, virtual assistant program 112 analyzes the received communication. In embodiments of the present invention, virtual assistant program 112 transmits an encoded audio signal. In embodiments of the present invention, virtual assistant program 112 determines whether a response encoded audio signal is received. In embodiments of the present invention, in response to not receiving a response encoded audio signal, virtual assistant program 112 transmits the audio. In embodiments of the present invention, in response to receiving a response encoded audio signal, virtual assistant program 112 determines the communication protocol. In embodiments of the present invention, virtual assistant program 112 transfers the data in the determined communication protocol.

In an embodiment, an encoded audio signal is a piece of audio data that has been encoded, using modulation or demodulation. In an embodiment, the encoded audio signal is encoded on the sending device and then decoded on the receiving device. In an embodiment, the encoded audio signal may be audible. In an alternative embodiment, the encoded audio signal may be inaudible (e.g., ultrasound). In an embodiment, the encoded audio signal is a piece of audio data that has been modified using sound modulation.

In an embodiment, computing device 110 includes information repository 114. In an embodiment, information repository 114 may be managed by virtual assistant program 112. In an alternative embodiment, information repository 114 may be managed by the operating system of computing device 110, another program (not shown), alone, or together with, virtual assistant program 112. Information repository 114 is a data repository that can store, gather, and/or analyze information. In some embodiments, information repository 114 is located externally to computing device 110 and accessed through a communication network, such as network 130. In some embodiments, information repository 114 is stored on computing device 110. In some embodiments, information repository 114 may reside on another computing device (not shown), provided information repository 114 is accessible by computing device 110. Information repository 114 includes, but is not limited to, communication preferences, communication types available for computing device(s), computing device(s) information, encoded audio signal information, timing information, confirmation question information, communication history, etc.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

In an embodiment, computing device 110 is substantially similar to computing device 120. In an embodiment, computing device 120 includes virtual assistant program 122, which is substantially similar to virtual assistant program 112, and information repository 124, which is substantially similar to information repository 114.

Figure 2:
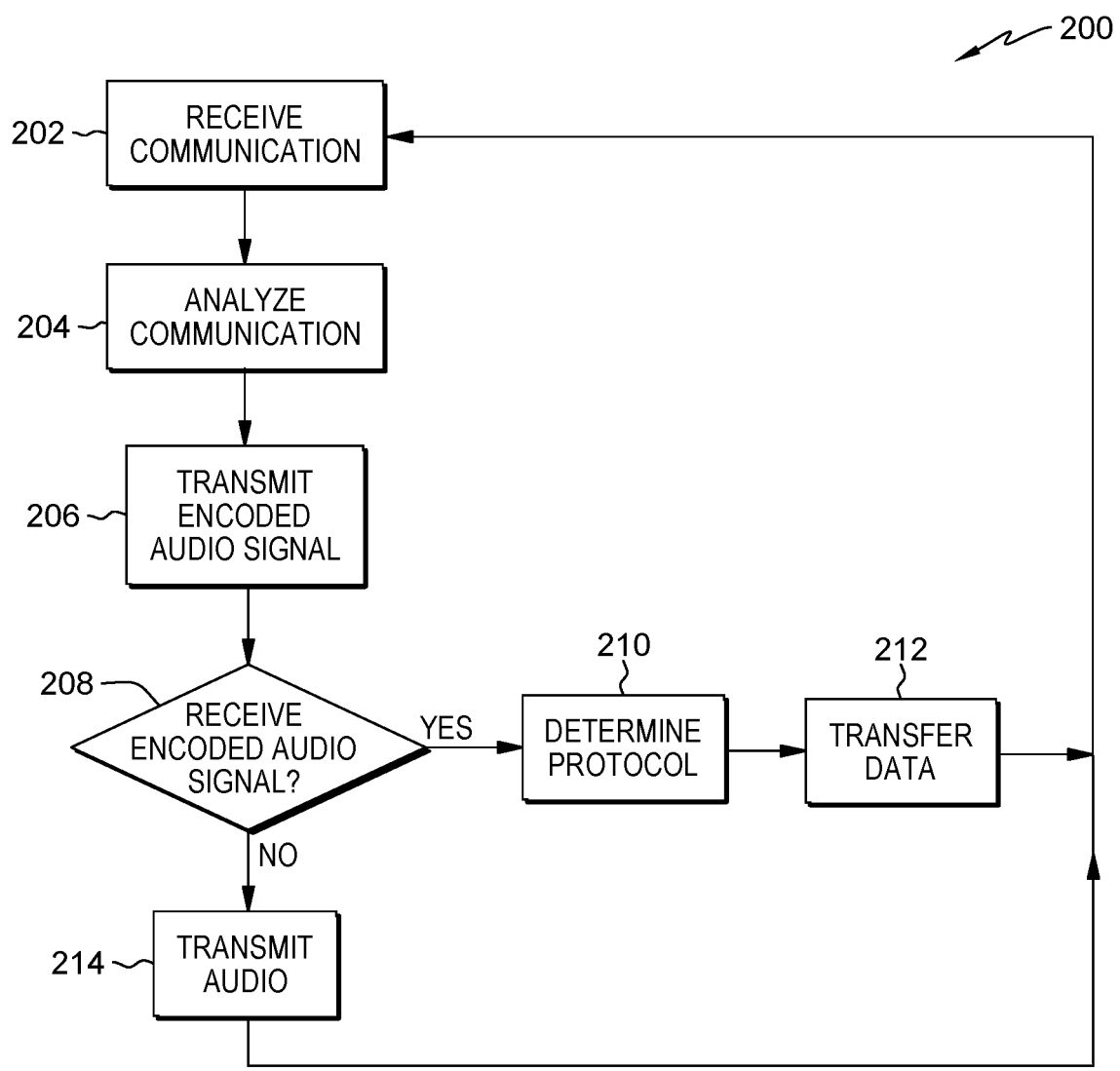
FIG. 2 is a flow chart diagram depicting operational steps for virtual assistant program 112 or virtual assistant program 122, in accordance with at least one embodiment of the invention.

FIG. 2 is a flow chart diagram depicting operational steps of workflow 200 for virtual assistant program 112 in accordance with at least one embodiment of the invention. It should be appreciated that embodiments of the present invention provide at least for communication from a virtual assistant (i.e. virtual assistant program 112) on computing device 110 to computing device 120. In an embodiment, a user may communicate, using computing device 120, to virtual assistant program 112 on computing device 110. In another embodiment, virtual assistant program 112, or any other program (not shown), may communicate, using computing device 120, to virtual assistant program 112 on computing device 110. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Virtual assistant program receives a communication (step 202). At step 202, virtual assistant program 112 receives a communication from computing device 110 and/or a user of computing device 110. In an embodiment, the communication may be triggered by a user in real time. In a first example, a user may speak into the microphone (not shown) of computing device 110 saying, "Please setup an appointment to get my haircut at 10 AM." In an alternative embodiment, the communication may be triggered by another program on computing device 110 or another computing device (not shown). In a second example, a scheduling program (not shown) may indicate to virtual assistant program 112, via a data transfer, to setup a hair appointment for a person at 10 AM.

Virtual assistant program 112 analyzes the communication (step 204). At step 204, virtual assistant program 112 analyzes the communication to determine the form of the communication and where the communication should be directed. In other words, virtual assistant program 112 determines who the recipient of the communication should be. In an embodiment, virtual assistant program 112 may analyze the communication by using natural language processing. In the first example, virtual assistant program 112 may use natural language processing on "Please setup an appointment to get my haircut at 10 AM." In this example, virtual assistant program 112 determines the communication is in an audio form and that the communication should be directed to the barber the user always has their hair cut. In this example, the barber uses computing device 120. In an alternative embodiment, virtual assistant program 112 may analyze the communication by analyzing the metadata attached to the communication. In the second example, virtual assistant program 112 may analyze the metadata attached with the communication to setup a hair appointment for the person at 10 AM and determine the communication is in a data form and that the communication should be directed to the barber the user always has their cut. In this example, the barber uses computing device 120.

Virtual assistant program 112 transmits an encoded audio signal (step 206). At step 206, virtual assistant program 112 transmits an encoded audio signal to the computing device indicated by the communication. In an embodiment, the encoded audio signal includes, but is not limited to, information about the sending device (e.g., computing device 110) and an indication that the sending device would like to communicate with the receiving device. In the first and second example, virtual assistant program 112 transmits an encoded audio signal to 120, that is received using virtual assistant program 122. In these examples, the encoded audio signal indicates computing device 110 is sending the encoded audio signal and that computing device 110, via virtual assistant 112, would like to communicate to computing device 120, via virtual assistant 122.

Virtual assistant program 112 determines whether an encoded audio signal was received (decision step 208). At decision step 208, virtual assistant program 112 determines whether a response encoded audio signal was received in response to the encoded audio signal transmitted by virtual assistant program 112 in step 206. In an embodiment, virtual assistant program 112 will determine if an amount of time has lapsed before determining whether a response encoded audio signal has not been received. In other words, virtual assistant program 112 will determine if the response encoded audio signal was received within a threshold time period. For example, if virtual assistant program 112 has not received a response encoded audio signals in three seconds, virtual assistant program 112 will determine a response encoded audio signal has not been received. In an embodiment, the response encoded audio signal includes, but is not limited to, the preferred method of communication between the two devices. In an embodiment, the preferred methods of communication can be selected from the group consisting of, but are not limited to, point to point (e.g. TCP/IP sockets—HTTP), Secure File Transfer Procedure, webhooks, queue management, text messages, email protocols, audio over the phone, or any other form of communication over the internet or phone system, etc. In an embodiment, if a response encoded audio signal is received (decisions step 208, yes branch), processing proceeds to step 210. In an embodiment, if a response encoded audio signal is not received (decision step 208, no branch), processing proceeds to step 214. In yet another embodiment, if a response encoded audio signal is received (decisions step 208, yes branch) and the response encoded audio signal indicates the preferred form of communication is audio, processing proceeds to step 214.

In the first example, the barber answers his phone (e.g. computing device 120) and the encoded audio signal from virtual assistant program 112 is inaudible. The barber does not hear the encoded audio signal and therefore does not answer. In this example, virtual assistant program 112 determines that a response encoded audio signal has not been received because three seconds have elapsed without a response, therefore processing proceeds to step 214. In the second example, the barbershop has an automated scheduling program (i.e. virtual assistant program 122) that answers the phone (i.e. computing device 120). Here, the automated scheduling program can hear the encoded audio signal and respond with a response encoded audio signal back to virtual assistant program 112. The automated scheduling program of the barber indicates the preferred form of communication is either a modulated sound signal or a http request via the internet. In this example, processing proceeds to step 210.

Virtual assistant program 112 determines the protocol (step 210). At step 210, virtual assistant program 112 determines the transfer protocol to use for transferring the data from computing device 110 to computing device 120. In a first embodiment, if the response encoded audio signal indicates a single transfer protocol, virtual assistant program 112 determines that is the protocol to use. In a second embodiment, if the response encoded audio signal indicates two or more transfer protocols, virtual assistant program 112 accesses communication preferences in information repository 114 to determine the transfer protocol that is more preferred and/or higher ranked. In the second example, virtual assistant program 112 determines the response encoded audio signal indicates either a modulated sound signal or http request via the internet is the preferred transfer protocol. Here, virtual assistant program 112 determines, from the communication preferences in information repository 114, that a http request via the internet is a higher ranked transfer protocol than a modulated sound signal. Therefore, virtual assistant program 112 determines http request via the internet is the transfer protocol to use.

Virtual assistant program 112 transfers the data (step 212). At step 212, virtual assistant program 112 transfers the data to virtual assistant program 122 on computing device 120 via the determined protocol. In the second example, virtual assistant program 112 transfers the data that indicates to setup a hair appointment for a person at 10 AM using an http request via the internet. Upon completion of transferring the data, virtual assistant program 122 proceeds to return to step 202 to receive another communication.

Virtual assistant program 112 transmits the audio (step 314). At step 214, in response to a response encoded audio signals not received within a time period or the response encoded audio signal indicates the preferred form of communication is audio then virtual assistant program 112 transmits the audio of the communication received in step 202 to virtual assistant 122 on computing device 120. In a first embodiment, virtual assistant program 112 transmits identical received audio. In a second embodiment, virtual assistant program 112, by itself or with the assistance of another program, analyzes the received audio using natural language processing and creates a new audio file to transmit. In this embodiment, the new audio file will be the audio needed to complete the received communication in step 202. In the first example, no response encoded audio signal was received in the time period, therefore virtual assistant 112 transmits the audio recording of "Please setup an appointment to get my haircut at 10 AM," to the barber on computing device 120, from there virtual assistant 112 completes the appointment setup by using natural language processing with the barber. Upon completion of transferring the audio, virtual assistant program 122 proceeds to return to step 202 to receive another communication.

In an embodiment, the encoded audio signal sent in step 206 will be transmitted at a time interval, based on the preferences in information repository 114 to confirm that the communication should continue in its current form or should change to a different form of communication. In other words, the encoded audio signal sent in step 206 will be transmitted in a repeating pattern at a time interval to confirm communication in the current form. In this embodiment, the change in communication may be due to damaged communication lines. In this embodiment, if a response encoded audio signal to the repeating encoded audio signal is not received within a time period, a new communication form may be determined. In an embodiment, when the encoded audio signal is sent in step 206, a confirmation question, found in either information repository 114 or information repository 124, may also be sent to both computing device 110 and computing device 120. In this embodiment, if a user of either computing device 110 or computing device 120 answers the confirmation question correctly, the transfer of the communication will at least be in audio form, but may also be in data form (i.e. both forms), so that the user can listen to the interaction between virtual assistant 112 and virtual assistant 122.

Figure 3:
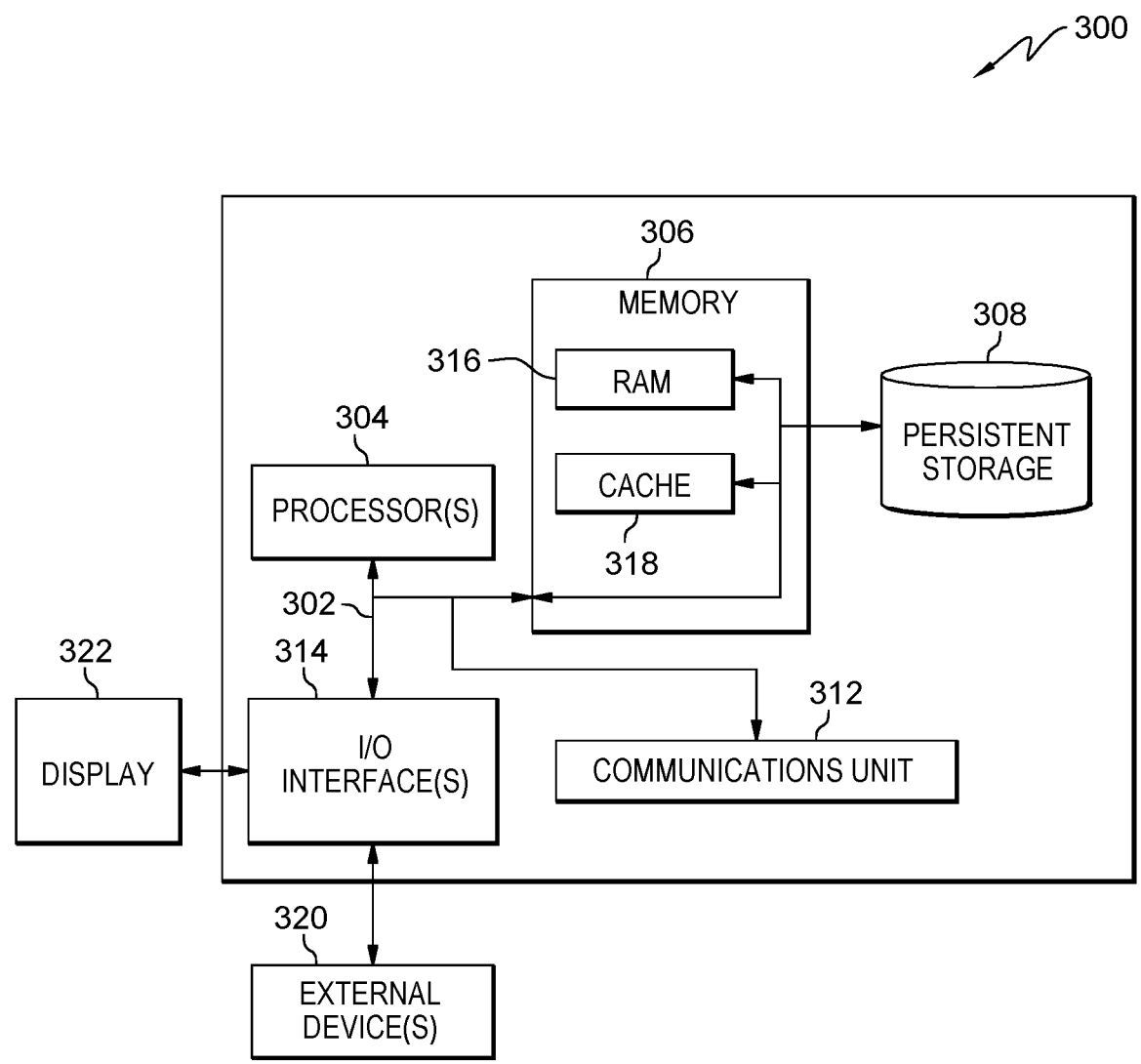
FIG. 3 is a block diagram depicting components of a computer, generally designated 300, suitable for executing virtual assistant program 112 or virtual assistant program 122, in accordance with at least one embodiment of the invention.

FIG. 3 is a block diagram depicting components of a computer 300 suitable for virtual assistant program 112 or virtual assistant program 122, in accordance with at least one embodiment of the invention. FIG. 3 displays the computer 300, one or more processor(s) 704 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with an architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random-access memory (RAM) 316 and a cache 318. In general, the memory 306 may comprise any suitable volatile or non-volatile one or more computer readable storage media.

Program instructions virtual assistant program 112 or virtual assistant program 122 may be stored in the persistent storage 308, or more generally, any computer readable storage media, for execution by one or more of the respective computer processors 304 via one or more memories of the memory 306. The persistent storage 308 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for virtual assistant communication, the method comprising the steps of:
    receiving, by one or more computer processors, a communication;
    analyzing, by the one or more computer processors, the communication to determine a form of the communication and a recipient of the communication;
    transmitting, by the one or more computer processors, an encoded audio signal to the recipient, wherein the encoded audio signal includes information about a sending device by using sound modulation to add the information;

responsive to transmitting the encoded audio signal, receiving, by the one or more computer processors, a response encoded audio signal, wherein the response audio signal includes a method of communication by using sound modulation to add the method; and responsive to receiving the response encoded audio signal, transmitting, by the one or more computer processors, the communication to the recipient in the method of communication based on the response encoded audio signal;

repeating, by the one or more computer processors, the encoded audio signal to the recipient at a time interval; and responsive to the response encoded audio signal not being received from the repeated encoded audio signal, transmitting, by the one or more computer processors, the communication in a new form of communication.

2. The computer-implemented method of claim 1, wherein the encoded audio signal is inaudible.

3. The computer-implemented method of claim 1, wherein the method of communication is selected from the group consisting of point to point (e.g. TCP/IP sockets—HTTP), Secure File Transfer Procedure, webhooks, queue management, text messages, email protocols, and audio over a phone.

4. The computer-implemented method of claim 1, further comprising:

transmitting, by the one or more computer processors, a confirmation question to a user that sent the communication; and responsive to receiving a correct answer to the confirmation question, transmitting, by the one or more computer processors, the communication in at least an audio form that the user can hear.

5. The computer-implemented method of claim 1, wherein the received response encoded audio signal is received within a threshold period of time.

6. A computer program product for virtual assistant communication, the computer program product comprising:

one or more computer readable storage media; and program instructions stored on the one or more computer readable storage media, the program instructions comprising:

program instructions to receive a communication;

program instructions to analyze the communication to determine a form of the communication and a recipient of the communication;

program instructions to transmit an encoded audio signal to the recipient, wherein the encoded audio signal includes information about a sending device by using sound modulation to add the information;

program instructions, responsive to transmitting the encoded audio signal, to receive a response encoded audio signal, wherein the response audio signal includes a method of communication by using sound modulation to add the method; and program instructions, responsive to receiving the response encoded audio signal, to transmit the communication to the recipient in the method of communication based on the response encoded audio signal;

program instructions to repeat the encoded audio signal to the recipient at a time interval; and responsive to the response encoded audio signal not being received from the repeated encoded audio signal, program instructions to transmit the communication in a new form of communication.

7. The computer program product of claim 6, wherein the encoded audio signal is inaudible.

8. The computer program product of claim 6, wherein the method of communication is selected from the group consisting of point to point (e.g. TCP/IP sockets—HTTP), Secure File Transfer Procedure, webhooks, queue management, text messages, email protocols, and audio over a phone.

9. The computer program product of claim 6, further comprising program instructions, stored on the one or more computer readable storage media, to:

transmit a confirmation question to a user that sent the communication; and responsive to receiving a correct answer to the confirmation question, transmit the communication in at least an audio form that the user can hear.

10. The computer program product of claim 6, wherein the received response encoded audio signal is received within a threshold period of time.

11. A computer system for virtual assistant communication, the computer system comprising:

one or more computer processors;

one or more computer readable storage media; and program instructions stored on the one or more computer readable storage media for execution by at least one of the one or more computer processors, the program instructions comprising:

program instructions to receive a communication;

program instructions to analyze the communication to determine a form of the communication and a recipient of the communication;

program instructions to transmit an encoded audio signal to the recipient, wherein the encoded audio signal includes information about a sending device by using sound modulation to add the information;

program instructions, responsive to transmitting the encoded audio signal, to receive a response encoded audio signal, wherein the response audio signal includes a method of communication by using sound modulation to add the method; and program instructions, responsive to receiving the response encoded audio signal, to transmit the communication to the recipient in the method of communication based on the response encoded audio signal;

program instructions to repeat the encoded audio signal to the recipient at a time interval; and responsive to the response encoded audio signal not being received from the repeated encoded audio signal, program instructions to transmit the communication in a new form of communication.

12. The computer system of claim 11, wherein the encoded audio signal is inaudible.

13. The computer system of claim 11, wherein the method of communication is selected from the group consisting of point to point (e.g. TCP/IP sockets—HTTP), Secure File Transfer Procedure, webhooks, queue management, text messages, email protocols, and audio over a phone.

14. The computer system of claim 11, further comprising program instructions, stored on the one or more computer readable storage media for execution by at least one of the one or more computer processors, to:

transmit a confirmation question to a user that sent the communication; and responsive to receiving a correct answer to the confirmation question, transmit the communication in at least an audio form that the user can hear.

\* \* \* \* \*